(12) United States Patent
Chang (10) Patent No.: US 11,636,619 B2
(45) Date of Patent: Apr. 25, 2023

(54) SYSTEM AND METHOD FOR GENERATING BASIC INFORMATION FOR POSITIONING AND SELF-POSITIONING DETERMINATION DEVICE

(71) Applicant: Institute For Information Industry, Taipei (TW)

(72) Inventor: Jun-Dong Chang, Taipei (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 273 days.

(21) Appl. No.: 17/113,899

(22) Filed: Dec. 7, 2020

(65) Prior Publication Data

US 2022/0156962 A1 May 19, 2022

(30) Foreign Application Priority Data

Nov. 19, 2020 (TW) .................................. 109140466

(51) Int. Cl.
*G06K 9/00* (2022.01)
*G06T 7/73* (2017.01)
(Continued)

(52) U.S. Cl.
CPC ................ *G06T 7/73* (2017.01); *G01S 17/86* (2020.01); *G06F 18/24* (2023.01); *G06T 7/50* (2017.01);
(Continued)

(58) Field of Classification Search
CPC ... G06T 7/73; G06T 7/50; G06T 2207/10028; G01S 17/86; G06K 9/6267
See application file for complete search history.

(56) References Cited

U.S. PATENT DOCUMENTS 9,739,881 B1 * 8/2017 Pavek .................... G01S 13/865
10,339,389 B2 * 7/2019 Xu .......................... G06V 20/56
(Continued)

FOREIGN PATENT DOCUMENTS

CN 102841345 A 12/2012
CN 108303721 A 7/2018
(Continued)

OTHER PUBLICATIONS

Object-Location-Aware Hashing for Multi-Label Image Retrieval via Automatic Mask Learning, Cheng-Qin Huang et al., IEEE, 2018, pp. 4490-4502 (Year: 2018).*
(Continued)

*Primary Examiner* — Jayesh A Patel
(74) *Attorney, Agent, or Firm* — CKC & Partners Co., LLC (57) ABSTRACT

A system and method for generating basic information for positioning and a self-positioning determination device are disclosed. The system includes an information supplying device and a computing device. The information supplying device recognizes an object position and an object category of each of a plurality of reference objects and accordingly generates a reference unique feature value for each reference object, and the computing device generates basic information for positioning according to the reference unique feature values. The self-positioning determination device recognizes an object position and an object category of a current object and accordingly generates a current unique feature value for the current object, and determines a position of itself according to the current unique feature value, the basic information for positioning, and a distance and an angle between the self-positioning determination device and the current object.

15 Claims, 5 Drawing Sheets

(51) Int. Cl.
  *G01S 17/86* (2020.01)
  *G06T 7/50* (2017.01)
  *G06F 18/24* (2023.01)

(52) U.S. Cl.
  CPC .............. *G06T 2207/10028* (2013.01); *G06T 2207/30252* (2013.01)

(56) References Cited

U.S. PATENT DOCUMENTS

| | | | |
|---|---|---|---|
| 11,580,721 B2* | 2/2023 | Iwamoto | G06F 18/22 |
| 2013/0060764 A1* | 3/2013 | Voinea | G06F 16/29 707/723 |
| 2014/0072169 A1* | 3/2014 | Haas | G06T 7/74 382/103 |
| 2014/0164415 A1* | 6/2014 | Duleba | G06F 16/29 707/758 |
| 2015/0331422 A1* | 11/2015 | Hartung | G05D 1/02 701/23 |
| 2016/0209846 A1* | 7/2016 | Eustice | G05D 1/0248 |
| 2018/0005054 A1* | 1/2018 | Yu | G06T 7/13 |
| 2018/0005063 A1* | 1/2018 | Chan | G06V 10/752 |
| 2018/0232947 A1* | 8/2018 | Nehmadi | G01S 7/295 |
| 2018/0330504 A1* | 11/2018 | Karlinsky | G06N 20/00 |
| 2018/0364717 A1* | 12/2018 | Douillard | G01S 17/86 |
| 2019/0050692 A1* | 2/2019 | Sharma | G06V 10/147 |
| 2019/0079193 A1* | 3/2019 | Gunnam | G01S 7/4808 |
| 2019/0138834 A1* | 5/2019 | Collet Romea | G06T 19/006 |
| 2019/0206116 A1* | 7/2019 | Xu | G06T 7/60 |
| 2019/0271549 A1* | 9/2019 | Zhang | G05D 1/0088 |
| 2019/0332120 A1* | 10/2019 | Choi | G01C 21/3848 |
| 2020/0089971 A1* | 3/2020 | Li | G01S 7/4972 |
| 2020/0117904 A1* | 4/2020 | van Oldenborgh | G06F 18/217 |
| 2020/0150275 A1* | 5/2020 | Zhu | G06T 19/20 |
| 2020/0193623 A1* | 6/2020 | Liu | G06N 3/04 |
| 2020/0334857 A1* | 10/2020 | Garud | B60R 1/00 |
| 2021/0019535 A1* | 1/2021 | Qu | G06V 20/56 |
| 2021/0241003 A1* | 8/2021 | Seo | G06T 7/73 |
| 2022/0011117 A1* | 1/2022 | Cheng | G06V 10/44 |
| 2022/0024485 A1* | 1/2022 | Theverapperuma | B60W 60/001 |

FOREIGN PATENT DOCUMENTS

| | | | | |
|---|---|---|---|---|
| DE | 102019004652 A1 * | 1/2020 | | |
| EP | 1686538 A2 * | 8/2006 | ......... | G06K 9/00798 |
| EP | 3185171 A1 * | 6/2017 | ............ | G06F 30/00 |
| EP | 3333803 A1 * | 6/2018 | ............ | G01S 19/40 |
| WO | WO-2019209057 A1 * | 10/2019 | ............ | B60W 30/14 |
| WO | WO-2020154966 A1 * | 8/2020 | ............ | G01S 17/42 |

OTHER PUBLICATIONS

Instance-Aware Hashing for Multi-Label Image Retrieval, Hanjiang Lai et al., IEEE, 2016, pp. 2469-2479 (Year: 2016).*

Scalable Object Detection using Deep Neural Networks, Dumitru Erhan et al., CVF, 2014, pp. 1-8 (Year: 2014).*

Deep Region Hashing for Efficient Large-scale Instance Search from Images, Jingkuan Song et al., arXiv, 2017, pp. 1-10 (Year: 2017).*

The office action of the corresponding Taiwanese application No. TW109140466 dated Aug. 30, 2021.

* cited by examiner

SYSTEM AND METHOD FOR GENERATING BASIC INFORMATION FOR POSITIONING AND SELF-POSITIONING DETERMINATION DEVICE

PRIORITY

This application claims priority to Taiwan Patent Application No. 109140466 filed on Nov. 19, 2020, which is hereby incorporated by reference in its entirety.

FIELD

Embodiments of the present invention relate to a system, method, and device for positioning. More specifically, embodiments of the present invention relate to a system for generating basic information for positioning, a method for generating basic information for positioning, and a self-positioning determination device.

BACKGROUND

In order to meet requirements of positioning accuracy of automatic driving technology, the existing positioning technology may use sensors such as a LiDAR (Light Detection And Ranging) to sense depth information of traffic scenes (e.g., point cloud images), and generate detailed basic information for positioning with the depth information through various algorithms (e.g., a Normal Distributions Transform (NDT) algorithm). However, due to the huge amount of data of the existing basic information for positioning, the memory usage of a terminal device which needs the self-positioning function is greatly increased, and the cost required for updating the basic information for positioning is extremely high.

Accordingly, an urgent need exists in the art to reduce the data amount of the existing basic information for positioning, thereby reducing the memory usage of the terminal device which needs the self-positioning function, and reducing the cost required for updating the basic information for positioning.

SUMMARY

To solve at least the aforesaid problems, certain embodiments of the present invention provide a system for generating basic information for positioning. The system for generating basic information for positioning may comprise at least one information supplying device and a computing device which are connected with each other. The at least one information supplying device may be configured to: recognize an object position and an object category of each of a plurality of reference objects; and generate a first unique feature value of each of the plurality of reference objects according to the object position and the object category of a corresponding one of the plurality of reference objects. The computing device may be configured to: receive the plurality of first unique feature values of the plurality of reference objects from the at least one information supplying device; and generate basic information for positioning according to the plurality of first unique feature values of the plurality of reference objects.

To solve at least the aforesaid problems, certain embodiments of the present invention provide a method for generating basic information for positioning. The method for generating basic information for positioning may be adapted for use in a system for generating basic information for positioning. The system for generating basic information for positioning may comprise at least one information supplying device and a computing device which are connected with each other. The method for generating basic information for positioning may comprise: recognizing, by the at least one information supplying device, an object position and an object category of each of a plurality of reference objects; generating, by the at least one information supplying device, a first unique feature value of each of the plurality of reference objects according to the object position and the object category of a corresponding one of the plurality of reference objects; receiving, by the computing device, the plurality of first unique feature values of the plurality of reference objects from the at least one information supplying device; and generating, by the computing device, basic information for positioning according to the plurality of first unique feature values of the plurality of reference objects.

To solve at least the aforesaid problems, certain embodiments of the present invention provide a self-positioning determination device. The self-positioning determination device may comprise a storage and a processor that are electrically connected with each other. The storage may configured to store basic information for positioning, wherein the basic information for positioning may comprise a plurality of reference unique feature values of a plurality of reference objects, and each of the plurality of reference unique feature values is generated according to an object position and an object category of a corresponding one of the plurality of reference objects. The processor may be configured to: recognize an object position and an object category of a current object; generate a current unique feature value of the current object according to the object position and the object category of the current object; and determine a position of the self-positioning determination device itself according to the current unique feature value of the current object, the basic information for positioning, and the distance and angle between the self-positioning determination device and the current object. The plurality of reference unique feature values and the current unique feature value are generated in a same way.

According to the embodiments of the present invention, the basic information for positioning comprises a corresponding unique feature value generated for each reference object in a traffic scene, so that when the self-positioning determination device is in the traffic scene, the self-positioning determination device can find out the matching reference object simply by comparing the unique feature value of the detected current object with the unique feature values stored in the basic information for positioning. Further, a position of the self-positioning determination device can be calculated according to the position information of the matching reference object. Because it is no longer necessary to store a large amount of complete depth information of the traffic scene and complex algorithms, the embodiments of the present invention can greatly reduce the memory usage of the terminal device which needs the self-positioning function, and greatly reduce the cost required for updating the basic information for positioning.

What described above are not intended to limit the present invention, but only generally describe the technical problems that can be solved by the present invention, the technical means that can be adopted by the present invention, and the technical effects that can be achieved by the present invention so that a person having ordinary skill in the art can preliminarily understand the present invention. The detailed technology and preferred embodiments implemented for the subject invention are described in the following paragraphs accompanying the appended drawings for a person having ordinary skill in the art to well appreciate the features of the claimed invention.

BRIEF DESCRIPTION OF THE DRAWINGS

The attached drawings may assist in explaining various embodiments of the present invention, in which.

DETAILED DESCRIPTION

In the following description, the present invention will be explained with reference to multiple example embodiments thereof. However, the description of these example embodiments is not intended to limit the present invention to specific details of the operations, environments, applications, structures, processes, or steps described in these embodiments. For ease of description, contents unrelated to the embodiments of the present invention or contents that can be appreciated without particular description are omitted from depiction herein and in the attached drawings; and dimensions of elements and proportional relationships among individual elements in the attached drawings are only exemplary examples but not intended to limit the present invention. Unless stated particularly, same (or similar) reference numerals may correspond to same (or similar) elements in the following contents. Unless otherwise specified, the number of each element described below may be one or more while being implementable.

Terms used in the present disclosure are only used to describe the embodiments, and are not intended to limit the present invention. Unless the context clearly indicates otherwise, singular forms "a" and "an" are intended to comprise plural forms as well. Terms such as "comprising" and "including" indicate the presence of stated features, integers, steps, operations, elements and/or components, but do not exclude the presence of one or more other features, integers, steps, operations, elements, components and/or combinations thereof. The term "and/or" comprises any and all combinations of one or more associated listed items.

Figure 1:
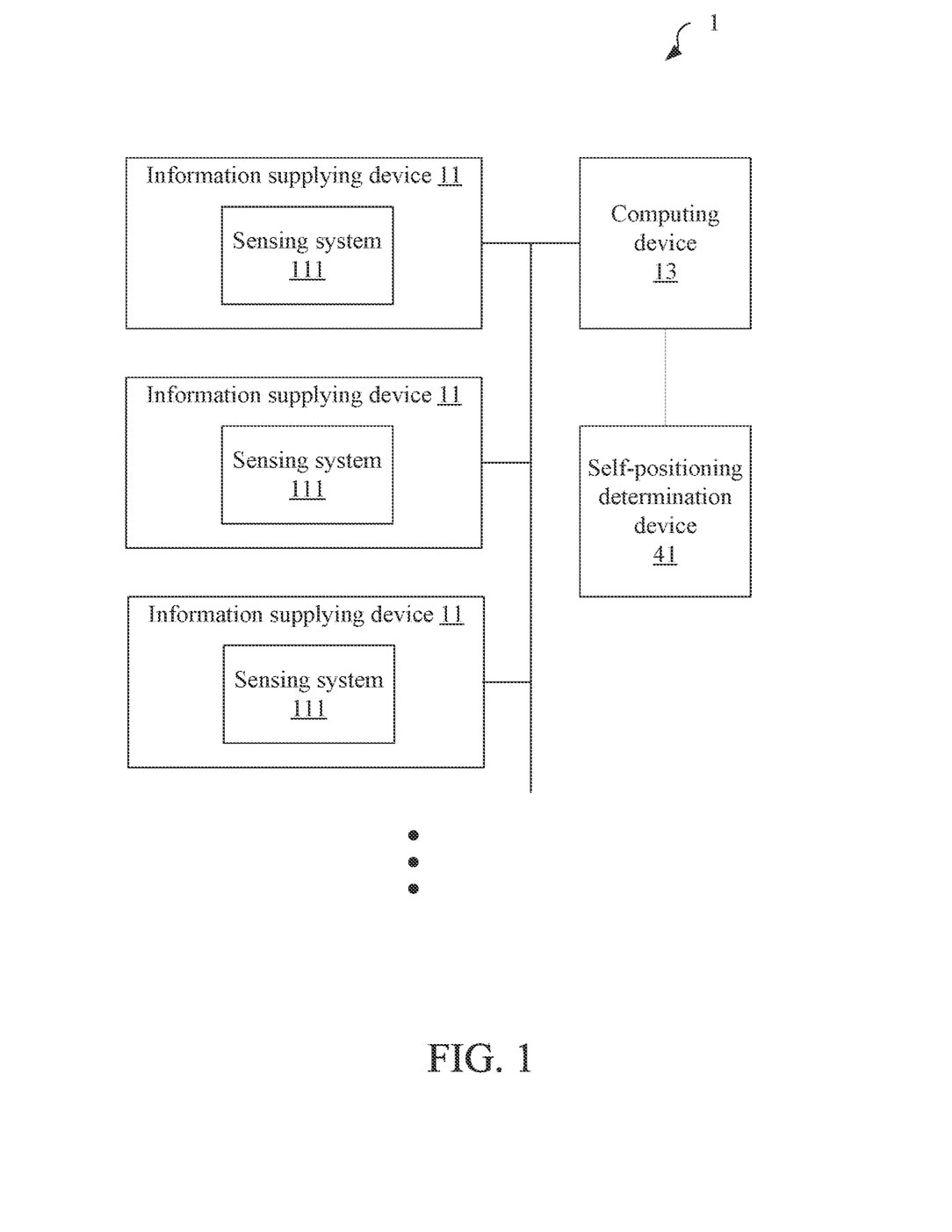
FIG. 1 illustrates a structure of a system for generating basic information for positioning according to some embodiments of the present invention.

FIG. 1 illustrates a structure of a system for generating basic information for positioning according to some embodiments of the present invention. However, the contents shown in FIG. 1 are only for illustrating embodiments of the present invention instead of limiting the scope claimed in the present invention.

Referring to FIG. 1, a system 1 for generating basic information for positioning may basically comprise at least one information supplying device 11 and a computing device 13. The number of information supplying device 11 shown in FIG. 1 is not limited. In some embodiments, the computing device 13 and an information supplying device 11 may be placed in a same object (e.g., a vehicle), and connected with each other through various cables. In some embodiments, the computing device 13 and the information supplying device 11 may be placed in different positions and connected with each other through various networks.

Each information supplying device 11 is a computing device. In some embodiments, an information supplying device 11 belongs to a part of the built-in system of various vehicles (such as general automobiles, self-driving cars, trains, MRT, motorcycles, airplanes and boats). In some embodiments, an information supplying device 11 is not a part of the built-in system of various vehicles, but may be installed on various vehicles to achieve the same effect.

The information supplying device 11 may comprise various processing units (e.g., central processing units, microprocessors, microcontrollers), various storage units (e.g., memories, universal serial bus (USB) disks, hard disks, compact disks (CD), mobile disks, database, or other storage media or circuits with the same functions), and various input/output interfaces (such as Ethernet interfaces, Internet interfaces, telecommunication interfaces, USB interfaces). The information supplying device 11 may perform various logical operations through the processing unit and store the results of operations in the storage unit. The storage unit may store data generated by the information supplying device 11 itself and various data input to the information supplying device 11. The input/output interface may enable the information supplying device 11 to transmit and exchange information or data with various external devices (e.g., the computing device 13).

According to some embodiments of the present invention, each information supplying device 11 may further comprise a sensing system 111. For example, the sensing system 111 may comprise at least one camera, at least one LiDAR, or at least one camera and at least one LiDAR.

The camera may be one of various devices with the functions of capturing images dynamically and/or statically, such as but not limited to, digital cameras, video recorders, or various mobile devices with photographing functions. The camera may capture the image of a scene, so that the processor of the information supplying device 11 performs subsequent recognition for the scene.

A LiDAR is a variety of devices that may measure the depth information of a scene through illuminating beams, and may know the distance and angle between itself and specific objects in the scene. Depth information obtained by the LiDAR for scenes may be presented in the form of point cloud images. The LiDAR may obtain the point cloud image of a scene so that the processor of the information supplying device 11 performs subsequent recognition for the scene.

The computing device 13 may be one of various servers, notebook computers, tablet computers, desktop computers, and mobile devices. Similar to the information supplying device 11, the computing device 13 may also comprise various processing units, storage units, and input/output interfaces as described above. The computing device 13 may perform various logical operations through the processing unit and store the results of the operations in the storage unit. The storage unit may store data generated by the computing device 13 itself and various data input to the computing device 13. The input/output interface may enable the computing device 13 to transmit and exchange information or data with various external devices (e.g., the information supplying device 11 or other self-positioning determination devices).

Figure 2:
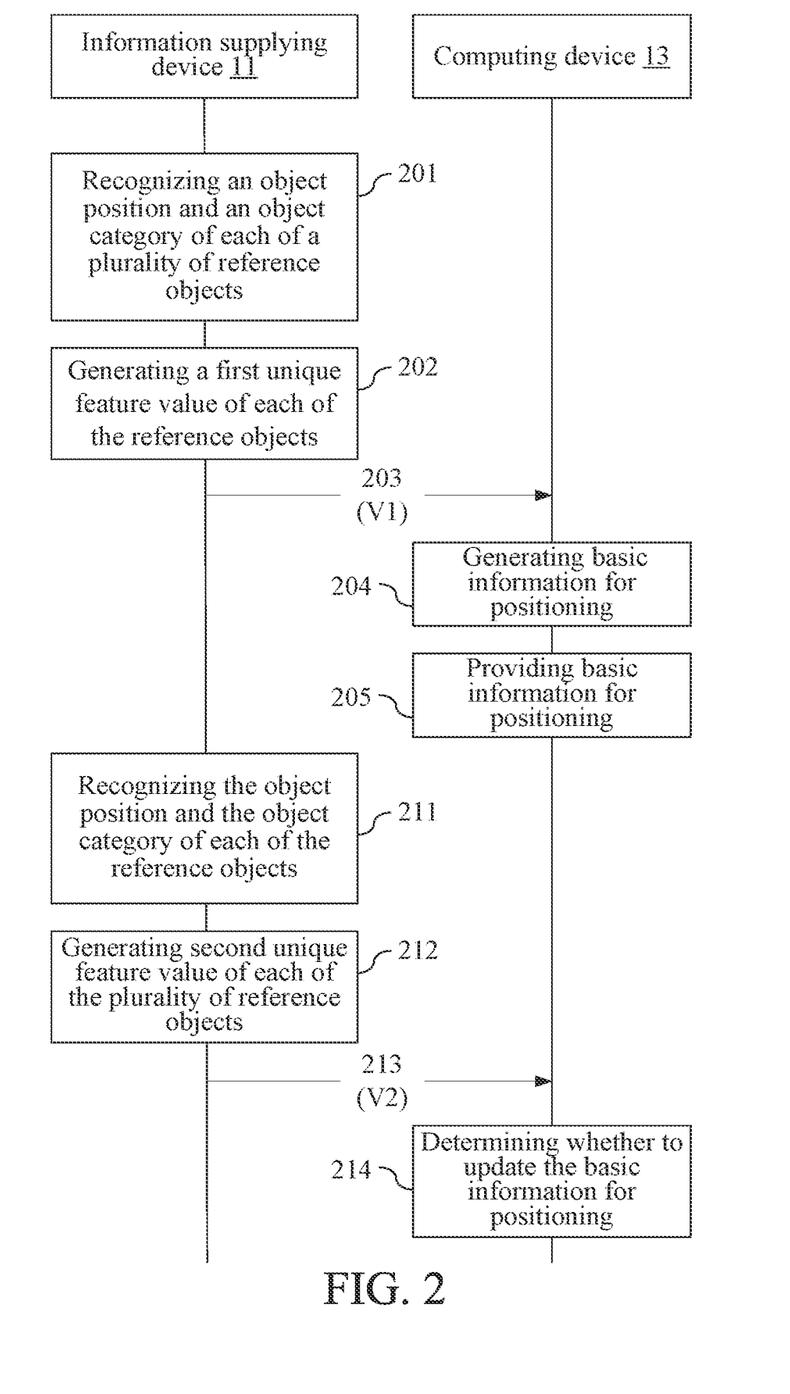
FIG. 2 illustrates details of creating basic information for positioning by the system for generating basic information for positioning shown in FIG. 1 according to some embodiments of the present invention.

FIG. 2 illustrates details of creating basic information for positioning by the system for generating basic information for positioning shown in FIG. 1 according to some embodiments of the present invention. However, the contents shown in FIG. 2 are only for illustrating embodiments of the present invention instead of limiting the scope claimed in the present invention.

Referring to FIG. 2, the operation of creating basic information for positioning by the system 1 for generating basic information for positioning may basically comprise actions 201 to 204. In some embodiments, in addition to the actions 201 to 204, the operation of creating basic information for positioning by the system 1 for generating basic information for positioning may further comprise an action 205. In some other embodiments, in addition to the actions 201 to 204 or the actions 201 to 205, the operation of creating basic information for positioning by the system 1 for generating basic information for positioning may further comprise actions 211 to 214.

First, in the action 201, each information supplying device 11 may recognize an object position and an object category of each of a plurality of reference objects in a scene where it is located.

In some embodiments, each information supplying device 11 recognizes the object position and the object category of each of the plurality of reference objects through the sensing system 111 thereof. The sensing system 111 comprised in each information supplying device 11 may comprise at least one of a camera and a LiDAR. If the sensing system 111 comprises a camera, then the information supplying device 11 may obtain one or more images of the scene through the camera. If the sensing system 111 comprises a LiDAR, then the information supplying device 11 may obtain one or more point cloud images of the scene through the LiDAR.

After obtaining the image and/or point cloud image of the scene through the sensing system 111, the processing unit of the information supplying device 11 may use various known image recognition techniques or algorithms to recognize objects (preferably static objects) in the image and/or point cloud image, and regard these objects as reference objects.

In an embodiment where the information supplying device 11 itself does not comprise the sensing system 111, the information supplying device 11 may also receive the image and/or the point cloud image of the scene where it is located from the outside (for example, a camera or a LiDAR disposed on a transportation vehicle).

After recognizing a reference object, the information supplying device 11 may further recognize the distance and angle between the reference object and the information supplying device 11 as well as the object category of the reference object. In some embodiments, the information supplying device 11 may comprise a locator (e.g., a GPS (Global Positioning System) locator) to obtain the position of itself (e.g., GPS coordinates), and according to the position of the information supplying device 11 itself and the distance and angle between a certain reference object and the information supplying device 11, the information supplying device 11 may calculate the object position of the reference object (i.e., the GPS coordinates of the object).

The object categories of the reference objects may include categories of scene objects appearing in various traffic scenes, such as but not limited to: various traffic signs (such as traffic lights and road signs), buildings, overpasses, and street lamps. According to different embodiments, the object categories of the reference objects may be represented by using preset serial numbers.

Then, in the action 202, the information supplying device 11 generates a first unique feature value V1 of each of the plurality of reference objects according to the object position and the object category of a corresponding one of the plurality of reference objects.

In some embodiments, the information supplying device 11 may perform a hash operation on the values corresponding to the object position (e.g., the GPS coordinate value) and the object category (e.g., the number value of the object category) of each reference object to obtain a hash value representing the reference object, and set the hash value as the first unique feature value V1 of the reference object.

In some embodiments, the information supplying device 11 may create a lookup table for all reference objects. In the lookup table, each reference object only corresponds to a unique lookup table value which is taken as its first unique feature value V1.

In the action 203, each information supplying device 11 may provide the first unique feature value(s) V1 that it generated for one or more reference objects to the computing device 13.

In the action 204, after receiving the first unique feature values V1 of the reference objects from the at least one information supplying device 11, the computing device 13 may generate basic information for positioning according to the first unique feature values V1 of the reference objects. The basic information for positioning may be a basic map for positioning, in which the object position of each reference object is marked with its position information and the corresponding first unique feature value V1.

In the action 205, after generating the basic information for positioning, the computing device 13 may transmit the basic information for positioning to various external devices (e.g., at least one self-positioning determination device 41), so that each of the external devices can calculate its position by using the basic information for positioning. For example, when a self-positioning determination device receives the basic information for positioning, the self-positioning determination device can find out the corresponding reference object in the basic information for positioning according to the unique feature value corresponding to the scene object detected by itself, and then calculate its position according to the object position information of the reference object and the position information of itself. In some embodiments, the self-positioning determination device 41 shown in FIG. 1 may also be one of the information supplying devices 11.

Next, through the following actions 211 to 214, the system for generating basic information for positioning may update the basic information for positioning created through the actions 201 to 204.

In the action 211, the information supplying device 11 may again recognize the object position and the object category of each of the reference objects. In the action 212, after the computing device 13 generates the basic information for positioning, the information supplying device 11 generates at least one second unique feature value V2 of each of the plurality of reference objects. In the action 213, the information supplying device 11 may provide the second unique feature value(s) V2 that it generated for one or more reference object to the computing device 13. The actions 211 to 213 performed by the information supplying device 11 are respectively the same as or similar to the operations of the aforementioned actions 201 to 203, and relevant details will not be further described herein. The only difference between the actions 211 to 213 and the actions 201 to 203 lies that the values of the first unique feature value V1 and the second unique feature value V2 may be different because the reference object in the same scene may vary (for example, the reference object is moved, a new reference object appears, or the reference object is removed).

In the action 214, after receiving the at least one second unique feature value V2, the computing device 13 may determine whether to update the basic information for positioning according to the first unique feature value V1 and the at least one second unique feature value V2 of one or each of the plurality of reference objects. In detail, when the computing device 13 receives a plurality of second unique feature values V2 of the same reference object provided by a plurality of information supplying devices 11, the computing device 13 may determine whether to update the basic information for positioning according to a majority of a same value from all the received second unique feature values V2 and the first unique feature value V1. For example, the basic information for positioning may be updated by replacing the value of the originally stored first unique feature value V1 of a reference object with the value of a certain received second unique feature value V2. If the majority is the same as the first unique feature value V1, the basic information for positioning is not updated; and otherwise, the basic information for positioning is updated.

In some embodiments, similar to the above-mentioned action 205, after updating the basic information for positioning, the computing device 13 may transmit the updated basic information for positioning to at least one self-positioning determination device 41.

Figure 3:
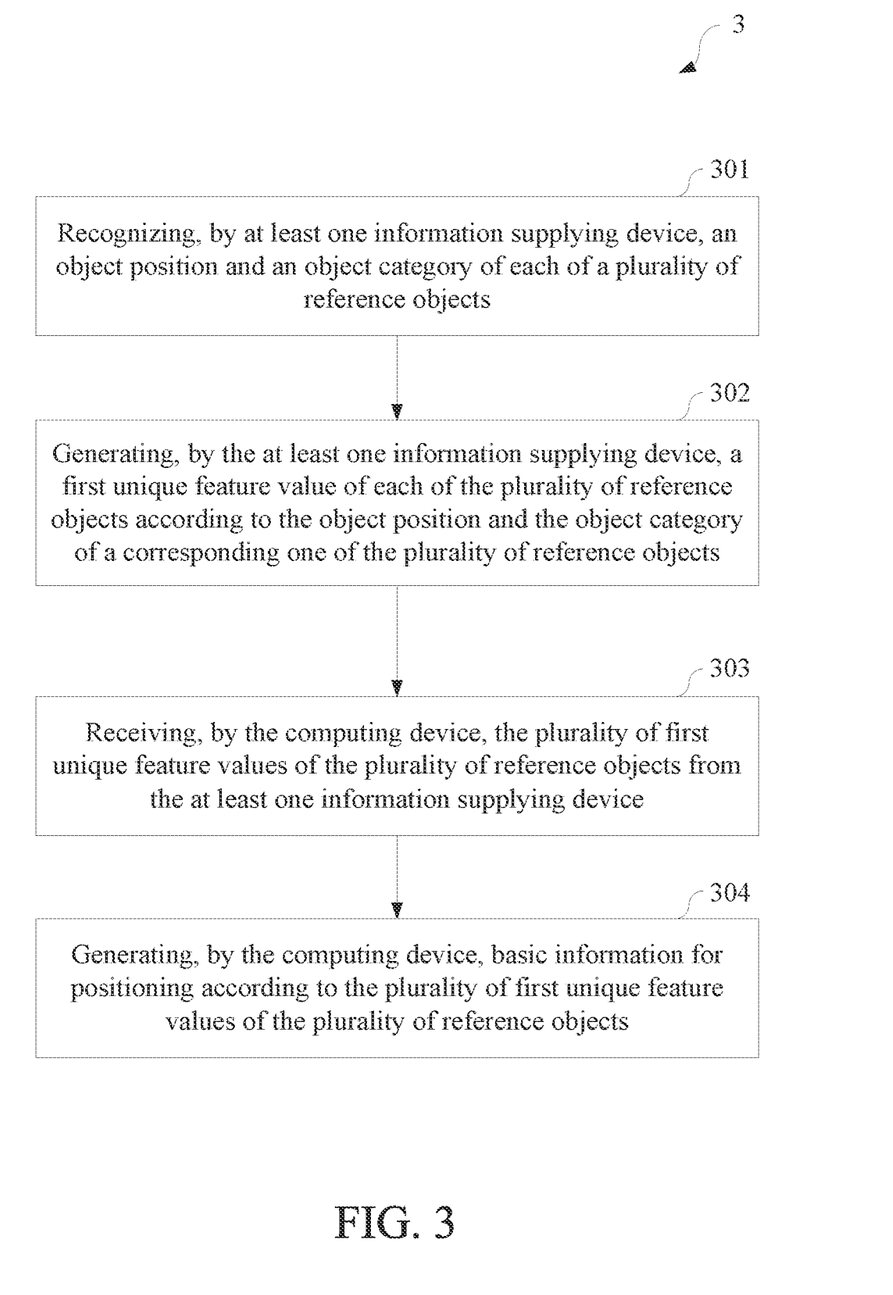
FIG. 3 illustrates a method for generating basic information for positioning according to some embodiments of the present invention.

FIG. 3 illustrates a method for generating basic information for positioning according to some embodiments of the present invention. However, the contents shown in FIG. 3 are only for illustrating embodiments of the present invention instead of limiting the scope claimed in the present invention. Referring to FIG. 3, a method 3 for generating basic information for positioning may be adapted for use in a system for generating basic information for positioning, the system for generating basic information for positioning may comprise at least one information supplying device and a computing device that are connected with each other, and the method 3 for generating basic information for positioning may comprise the following steps: recognizing, by the at least one information supplying device, an object position and an object category of each of a plurality of reference objects (labeled as step 301); generating, by the at least one information supplying device, a first unique feature value of each of the plurality of reference objects according to the object position and the object category of a corresponding one of the plurality of reference objects (labeled as step 302); receiving, by the computing device, the plurality of first unique feature values of the plurality of reference objects from the at least one information supplying device (labeled as step 303); and generating, by the computing device, basic information for positioning according to the plurality of first unique feature values of the plurality of reference objects (labeled as step 304).

The order of the step 301 to the step 304 shown in FIG. 3 is not limited. In any case where it is still implementable, the order of the step 301 to the step 304 shown in FIG. 3 may be adjusted arbitrarily.

According to some embodiments of the present invention, each of the at least one information supplying device comprises a sensing system; the sensing system of each of the at least one information supplying device comprises at least one camera, at least one LiDAR, or at least one camera and at least one LiDAR; and the at least one information supplying device recognizes the object position and the object category of each of the plurality of reference objects through the respective sensing system.

According to some embodiments of the present invention, the object position of each of the plurality of reference objects corresponds to a GPS coordinate.

According to some embodiments of the present invention, the first unique feature value of each of the plurality of reference objects corresponds to a hash value or a lookup table value.

According to some embodiments of the present invention, in addition to the step 301 to the step 304, the method 3 for generating basic information for positioning may further comprise transmitting, by the computing device, the basic information for positioning to at least one self-positioning determination device.

According to some embodiments of the present invention, in addition to the step 301 to the step 304, the method 3 for generating basic information for positioning may further comprise the following steps: generating, by the at least one information supplying device, at least one second unique feature value of each of the plurality of reference objects after the computing device generates the basic information for positioning; and determining, by the computing device, whether to update the basic information for positioning according to the first unique feature value and the at least one second unique feature value of each of the plurality of reference objects.

Each embodiment of the method 3 for generating basic information for positioning essentially corresponds to a certain embodiment of the system 1 for generating basic information for positioning. Therefore, even though each embodiment of the method 3 for generating basic information for positioning is not described in detail above, a person having ordinary skill in the art can directly appreciate the embodiments of the method 3 for generating basic information for positioning that are not described in detail according to the above description of the system 1 for generating basic information for positioning.

Figure 4:
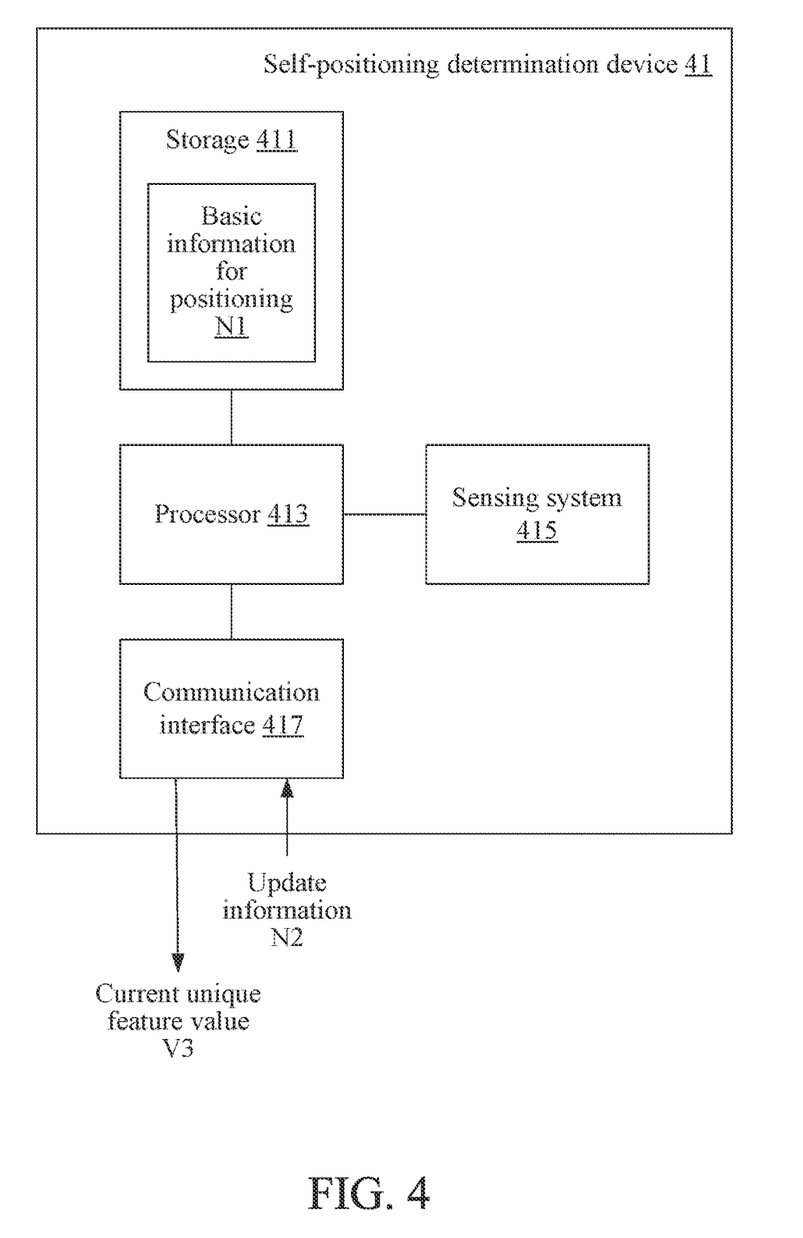
FIG. 4 illustrates a structure of a self-positioning determination device according to some embodiments of the present invention.

FIG. 4 illustrates a structure of a self-positioning determination device according to some embodiments of the present invention. However, the contents shown in FIG. 4 are only for illustrating embodiments of the present invention instead of limiting the scope claimed in the present invention.

Referring to FIG. 4, the self-positioning determination device 41 may basically comprise a storage 411 and a processor 413 electrically connected with each other. In some embodiments, the self-positioning determination device 41 may further comprise a sensing system 415 connected with the processor 413. In some other embodiments, the self-positioning determination device 41 may further comprise a communication interface 417 connected with the processor 413. The electrical connection among the storage 411, the processor 413, the sensing system 415, and the communication interface 417 may be direct connection (connected not via other elements) or indirect connection (connected via other elements).

The self-positioning determination device 41 may be one of various devices with self-positioning requirements. Similar to the aforementioned information supplying device 11, in some embodiments, the self-positioning determination device 41 belongs to a part of the built-in system of various vehicles (such as general automobiles, self-driving cars, trains, MRT, motorcycles, airplanes and boats). In some embodiments, the self-positioning determination device 41 is not a part of the built-in system of various vehicles, but may be installed on various vehicles to achieve the same effect. In some embodiments, the self-positioning determination device 41 and the information supplying device 11 may be implemented as a single device.

The processor 431 may be one of various microprocessors or microcontrollers capable of signal processing. The microprocessor or the microcontroller is a kind of programmable specific integrated circuit that is capable of operating, storing, outputting/inputting or the like. Moreover, the microprocessor or the microcontroller may receive and process various coded instructions, thereby performing various logical operations and arithmetical operations and outputting corresponding operation results. The processor 431 may be programmed to interpret various instructions and execute various tasks or programs, thereby achieving various corresponding functions described below.

The storage 411 may comprise various storage units comprised in general computing devices/computers, thereby achieving various corresponding functions described below. For example, the storage 411 may comprise a primary storage device (which is also called a main memory or internal memory) that is usually called for short as a memory and connected directly with the processor 413. The processor 413 may read instruction sets stored in the memory, and execute these instruction sets if needed. The storage 411 may further comprise a secondary storage device (which is also called an external memory or auxiliary memory), and the secondary storage device is connected with the processor 413 through an I/O channel of the memory and uses a data buffer to transmit data to the primary storage device. The secondary memory device may for example be one of various types of hard disks, and an optical disks. The storage 411 may further comprise a third-level storage device, e.g., a mobile disk or a cloud hard disk that can be inserted into or pulled out from a computer directly.

As shown in FIG. 4, the storage 411 may store basic information N1 for positioning, and the basic information N1 for positioning may comprise a plurality of reference unique feature values of a plurality of reference objects, and each of the plurality of reference unique feature values is generated according to an object position and an object category of a corresponding one of the plurality of reference objects. The basic information N1 for positioning may be the basic information for positioning generated by the computing device 13 in the action 204 as shown in the aforementioned FIG. 2, or may be the updated basic information for positioning generated by the computing device 13 after the action 214, and thus relevant details will not be further described herein.

The sensing system 415 may be one of various devices with the same or similar structure and function as the sensing system 111 shown in FIG. 1, and thus relevant details will not be further described herein. Similar to the sensing system 111, in some embodiments, the sensing system 415 may also comprise at least one camera, at least one LiDAR, or at least one camera and at least one LiDAR.

The communication interface 417 may comprise various input/output elements for wired/wireless communication comprised in general computer devices/computers, which may receive data from the outside and output data to the outside, thereby achieving various corresponding functions described below. The communication interface 417 may comprise, for example but not limited to, an Ethernet interface, an Internet interface, a telecommunication interface, and an USB interface.

Figure 5:
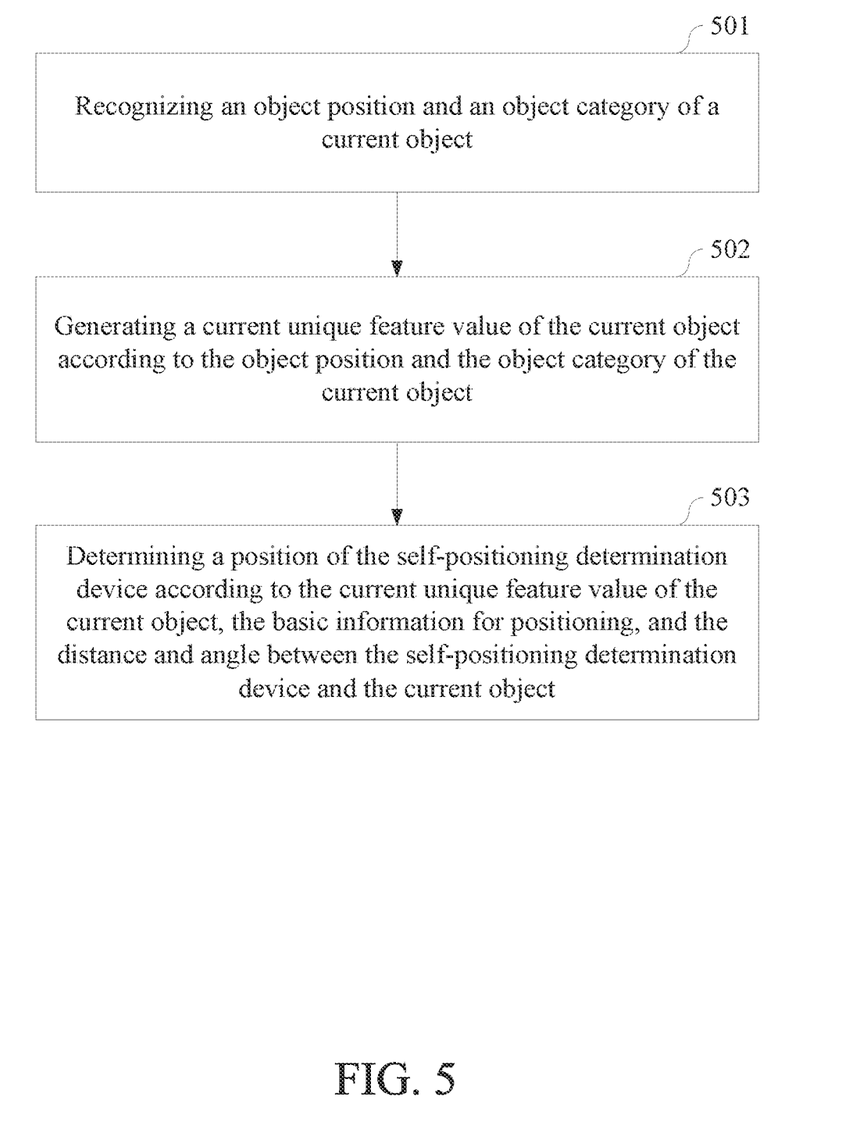
FIG. 5 illustrates details of determining a position of the self-positioning determination device of FIG. 4 by itself according to some embodiments of the present invention.

FIG. 5 illustrates details of determining a position of the self-positioning determination device 41 of FIG. 4 by itself according to some embodiments of the present invention. However, the contents shown in FIG. 5 are only for illustrating embodiments of the present invention instead of limiting the scope claimed in the present invention.

Referring to FIG. 5, the operation of determining the position of the self-positioning determination device 41 may basically comprise actions 501 to 503.

First, in the action 501, the processor 413 recognizes an object position and an object category of a current object. The way in which the processor 413 recognizes the object position and the object category of the current object may be the same as or similar to the way in which each information supplying device 11 recognizes the object position and the object category of each reference object in the aforesaid action 201 of FIG. 2. Similar to the operation of the aforesaid action 201, through the sensing system 415, the processor 413 may recognize the object position and the object category of the current object and recognize the distance and angle between the self-positioning determination device 41 and the current object, and relevant details will not be further described herein.

Similar to the information supplying device 11, in an embodiment where the self-positioning determination device 41 does not comprise the sensing system 415, the self-positioning determination device 41 may also receive the image and/or the point cloud image of the scene where it is located from the outside (for example, a camera or a LiDAR disposed on a transportation vehicle).

In the action 502, the processor 413 generates a current unique feature value V3 of the current object according to the object position and the object category of the current object. In detail, the operation of the processor 413 to generate the corresponding current unique feature value V3 for the current object may be basically the same as or similar to the operation performed by the information supplying device 11 to generate the first unique feature value V1 in the action 202 or the operation performed by the information supplying device 11 to generate the second unique feature value V2 in the action 212 of FIG. 2 above, and thus relevant details will not be further described herein.

Next, in the action 503, the processor 413 determines a position of the self-positioning determination device 41 according to the current unique feature value V3 of the current object, the basic information N1 for positioning, and the distance and angle between the self-positioning determination device 41 and the current object.

In detail, after calculating the current unique feature value V3 of the current object, the processor 413 may compare the current unique feature value V3 with a plurality of reference unique feature values provided by the basic information N1 for positioning, find out one matching reference unique feature value, and take the reference object position (e.g., the GPS coordinates) corresponding to the reference unique feature value as the object position of the current object. It shall be appreciated that, the plurality of reference unique feature values and the current unique feature value V3 are generated in a same way. Then, the processor 413 may calculate the position of the self-positioning determination device 41 (for example, the GPS coordinates of the self-positioning determination device 41) according to the determined object position of the current object and the distance and angle between the self-positioning determination device 41 and the current object.

In some embodiments, the processor 413 performs the actions 501 to 503 for a plurality of current objects instead of a single current object. In detail, the processor 413 recognizes the object position and the object category of each of a plurality of current objects, and recognizes the distance and angle between the self-positioning determination device 41 and each of the plurality of current objects. Then, the processor 413 generates the plurality of current unique feature values V3 respectively corresponding the plurality of current objects, and determines a position of the self-positioning determination device 41 in a similar way according to the plurality of current unique feature values V3 of the plurality of current objects, the basic information N1 for positioning, and the distances and angles between the self-positioning determination device 41 and the plurality of current objects. Relevant details will not be further described herein.

In some embodiments where the self-positioning determination device 41 further comprises the communication interface 417, in addition to the actions 501 to 503, the operation of determining the position of the self-positioning determination device 41 may further comprise the following actions: receiving a piece of update information N2 by the communication interface 417; and updating the basic information N1 for positioning by the processor 413 according to the piece of update information N2. In detail, when the communication interface 417 receives the update information N2 about the basic information N1 for positioning, the processor 413 may update the basic information N1 for positioning stored in the storage 411 according to the update information N2. For example, if the update information N2 is related to "a certain reference object being removed," then the processor 43 may remove the reference unique feature value and the relevant position information of the reference object from the basic information N1 for positioning.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A system for generating basic information for positioning, comprising:
   at least one information supplying device, being configured to:
   recognize an object position and an object category of each of a plurality of reference objects; and
   generate a first unique feature value of each of the plurality of reference objects according to the object position and the object category of each of the plurality of reference objects, wherein a hash operation is performed on the object position and the object category of each of the plurality of reference objects to obtain a hash value as the first unique feature value; and
   a computing device, being connected with the at least one information supplying device and being configured to:
   receive the plurality of first unique feature values of the plurality of reference objects from the at least one information supplying device; and
   generate basic information for positioning according to the plurality of first unique feature values of the plurality of reference objects.

2. The system for generating basic information for positioning of claim 1, wherein:
   each of the at least one information supplying device comprises a sensing system;
   the sensing system of each of the at least one information supplying device comprises at least one camera, at least one LiDAR, or at least one camera and at least one LiDAR; and
   the at least one information supplying device is configured to recognize the object position and the object category of each of the plurality of reference objects through respective sensing system.

3. The system for generating basic information for positioning of claim 1, wherein the object position of each of the plurality of reference objects corresponds to a GPS coordinate.

4. The system for generating basic information for positioning of claim 1, wherein the computing device is further configured to: transmit the basic information for positioning to at least one self-positioning determination device.

5. The system for generating basic information for positioning of claim 1, wherein:
   the at least one information supplying device is further configured to: generate at least one second unique feature value of each of the plurality of reference objects after the computing device generates the basic information for positioning; and
   the computing device is further configured to: determine whether to update the basic information for positioning according to the first unique feature value and the at least one second unique feature value of each of the plurality of reference objects.

6. A method for generating basic information for positioning, comprising:
   recognizing, by at least one information supplying device, an object position and an object category of each of a plurality of reference objects;
   generating, by the at least one information supplying device, a first unique feature value of each of the plurality of reference objects according to the object position and the object category of each of the plurality of reference objects, wherein a hash operation is performed on the object position and the object category of each of the plurality of reference objects to obtain a hash value as the first unique feature value;
   receiving, by an computing device, the plurality of first unique feature values of the plurality of reference objects from the at least one information supplying device; and
   generating, by the computing device, basic information for positioning according to the plurality of first unique feature values of the plurality of reference objects.

7. The method for generating basic information for positioning of claim 6, wherein:
   each of the at least one information supplying device comprises a sensing system;
   the sensing system of each of the at least one information supplying device comprises at least one camera, at least one LiDAR, or at least one camera and at least one LiDAR; and
   the at least one information supplying device recognizes the object position and the object category of each of the plurality of reference objects through respective sensing system.

8. The method for generating basic information for positioning of claim 6, wherein the object position of each of the plurality of reference objects corresponds to a GPS coordinate.

9. The method for generating basic information for positioning of claim 6, further comprising: transmitting, by the computing device, the basic information for positioning to at least one self-positioning determination device.

10. The method for generating basic information for positioning of claim 6, further comprising:
generating, by the at least one information supplying device, at least one second unique feature value of each of the plurality of reference objects after the computing device generates the basic information for positioning; and
determining, by the computing device, whether to update the basic information for positioning according to the first unique feature value and the at least one second unique feature value of each of the plurality of reference objects.

11. A self-positioning determination device, comprising:
a storage, being configured to store basic information for positioning, wherein the basic information for positioning comprises a plurality of reference unique feature values of a plurality of reference objects, and each of the plurality of reference unique feature values is generated according to an object position and an object category of each of the plurality of reference objects; and
a processor, being electrically connected with the storage, and being configured to:
recognize an object position and an object category of a current object;
generate a current unique feature value of the current object according to the object position and the object category of the current object; and
determine a position of the self-positioning determination device itself according to the current unique feature value of the current object, the basic information for positioning, and a distance and angle between the self-positioning determination device and the current object;

wherein the plurality of reference unique feature values and the current unique feature value are generated in a same way.

12. The self-positioning determination device of claim 11, further comprising a sensing system electrically connected to the processor, wherein:
the sensing system comprises at least one camera, at least one LiDAR, or at least one camera and at least one LiDAR; and
the processor is configured to recognize the object position and the object category of the current object and recognize the distance and angle between the self-positioning determination device and the current object through the sensing system.

13. The self-positioning determination device of claim 11, wherein the object position of each of the plurality of reference objects, the object position of the current object, and the position of the self-positioning determination device itself each corresponds to a GPS coordinate.

14. The self-positioning determination device of claim 11, wherein each of the plurality of reference unique feature values corresponds to a hash value or a lookup table value, and the current unique feature value corresponds to a hash value or a lookup table value.

15. The self-positioning determination device of claim 11, further comprising a communication interface electrically connected to the processor, wherein:
the communication interface is configured to receive a piece of update information; and
the processor is further configured to update the basic information for positioning according to the piece of update information.

* * * * *